United States Patent [19]

Ericksen et al.

[11] Patent Number: 5,921,280
[45] Date of Patent: Jul. 13, 1999

[54] REMOTELY CONTROLLABLE PROGRAMMABLE CONTROLLER FOR IRRIGATION

[75] Inventors: Kent C. Ericksen, Centerville; James A. Elzey, Bountiful, both of Utah

[73] Assignee: Pro-Mark, Inc., Bountiful, Utah

[21] Appl. No.: 08/961,742

[22] Filed: Oct. 31, 1997

[51] Int. Cl.$^6$ .............................. A01G 27/00; G06F 19/00
[52] U.S. Cl. .................. 137/624.11; 239/69; 312/223.6; 364/145
[58] Field of Search ...................... 137/624.11, 624.12; 239/69; 251/129.04; 312/223.6; 364/145, 146

[56] References Cited

U.S. PATENT DOCUMENTS

| | | |
|---|---|---|
| Re. 31,204 | 4/1983 | Sanner . |
| D. 392,619 | 3/1998 | Ericksen . |
| 3,653,595 | 4/1972 | Greengard, Jr. et al. . |
| 3,726,477 | 4/1973 | Shapiro . |
| 4,014,359 | 3/1977 | Sanner . |
| 4,176,395 | 11/1979 | Evelyn-Veere et al. ....... 137/624.11 X |
| 4,962,522 | 10/1990 | Marian . |
| 5,208,855 | 5/1993 | Marian . |
| 5,272,620 | 12/1993 | Mock et al. ......................... 239/69 X |
| 5,465,904 | 11/1995 | Vaello . |
| 5,479,338 | 12/1995 | Ericksen et al. . |

OTHER PUBLICATIONS

Professional Orbit Irrigation Products 1997.
WaterMaster by Orbit "Taking Innovation To New Heights" 1998.

*Primary Examiner*—Kevin Lee
*Attorney, Agent, or Firm*—Mallinckrodt & Mallinckrodt

[57] ABSTRACT

The activation and deactivation of a plurality of irrigation valves in accordance with instructions programmed into a programmable irrigation valve controller can be overridden by signals received by the controller from a remote control unit or a rain delay input. This allows remote control of sprinklers from the area being watered rather than at the location of the controller. This allows sprinkler repairs, modifications to watering patterns, and turning off and back on of sprinklers such as to access a portion of the irrigated area to be done without running back and forth to the controller. It also allows easy delay of watering after a rain. A construction of a programmable controller apparatus allows covering of wires extending from the apparatus and funneling of such wires into a conduit.

13 Claims, 4 Drawing Sheets

REMOTELY CONTROLLABLE PROGRAMMABLE CONTROLLER FOR IRRIGATION

BACKGROUND OF THE INVENTION

1. Field

The invention is in the field of irrigation controllers or timers which automatically operate irrigation systems, such as sprinkler systems, based on preprogrammed instructions.

2. State of the Art

Irrigation systems, such as turf watering systems and trickle watering systems for trees and shrubs are used extensively, particularly in arid and semiarid areas of the world, such as the western portion of the United States. The typical modern turf watering system consists of a plurality of sprinklers spaced according to the range of the sprinklers so as to cover the entire turf area. Individual sprinklers are fed by underground water pipes connected to a water supply source through electrically operated valves. The sprinklers are typically organized into groups or zones such that several individual sprinklers in a particular area of the turf are controlled by a single valve, with several separately controlled groups or zones required to cover the entire turf area. Typically, only one zone is watered at a time to ensure sufficient pressure to operate the sprinklers in the zone.

The electrically operated valves are typically controlled and sequenced by an electric timer or controller to which the valves are connected. Modern controllers are typically of solid state design and allow the user to control the sequence of zones to be watered, the start time of each watering, the duration of each watering, and the interval between waterings. A shortcoming of the typical modern solid state and older controllers which used mechanical clock-type timers is that if the preprogrammed watering schedule is desired to be stopped for a period of time, such as when there has been plenty of rain, the user has to stop operation and when the desired period has elapsed, has to remember to restart operation.

Another shortcoming of modern irrigation controllers is that should there be a problem, such as a broken sprinkler, it is usually discovered only when the user is in the irrigated area with the sprinkler on. In order to repair the sprinkler, the person must go to the controller and manually override it to shut off the flow of water to the damaged sprinkler. The controller is typically affixed to the inside or outside wall of a building some distance from the sprinklers. After overriding the controller, the person must walk back to the location where the sprinkler is, repair it, walk back to the controller to turn on the water, and walk back to the sprinkler to observe whether the repairs have been successful. If unsuccessful, the sequence must be repeated until the repairs are successful. At other times, a person may want to temporarily turn on a particular set of sprinklers to see if they are working, to temporarily water a particular zone in need thereof, or to turn off the watering in a particular zone, necessitating walking back to the controller to do so.

Separate remote control devices have been used along with sprinkler irrigation controllers. Such remote control devices are separate devices which are typically electrically connected in parallel with the controller to the respective water valve control solenoid such that the respective solenoid will be activated if either the preprogrammed or manual operation of the controller actuates the particular solenoid, or if the remote control is used to activate the particular solenoid. Thus, if a person wants to turn off a particular sprinkler which is turned on by the controller, it cannot be done remotely using the remote control since the controller is in parallel therewith. The person has to walk to the controller to turn off the sprinkler and back to turn it on again to continue the programmed watering. If a particular sprinkler is currently turned off, it can be turned on remotely, but if the controller turns on the sprinkler due to the preprogrammed instructions, then the remote control will not stop the flow of water therefrom. Therefore, an integrated remotely controllable irrigation controller is needed to overcome the disadvantages of separate systems.

Also, most controllers have a number of terminals along a bottom side thereof to which wires to the various electrically controlled valves are connected. Such wires extend from the terminals in uncovered and unprotected fashion. If a conduit is used to carry the wires from the sprinkler valves to the controller, the conduit ends below the controller and the wires extend from the conduit to the individual terminals of the controller. In some instances it would be advantageous to cover the wires as they extend from the conduit.

SUMMARY OF THE INVENTION

According to the invention, an irrigation controller includes a remote control unit which can control or override various controller functions remotely by a user at a distance from the controller. This allows a user to turn sprinklers on or off at any time from a location at the sprinkler rather than requiring the user to travel from the sprinkler to the controller to turn the sprinkler on or off. The remote control features and the timer are integrated into one unit and the remote control can override the timer so that valves turned on by the timer program may be manually turned off by a user with the remote control unit. The timer program continues to run and picks up in sequence after the remote control unit returns control to the controller such that the timer program in the controller picks up where it would have been had the remote control not been activated.

The controller apparatus comprises a support structure which houses the circuitry and electronics to provide variations in programmable watering sequences for each zone of individual sprinklers. A face plate thereof includes a display and multiple programming keys and a rotary switch which provides interaction between the user and the controller. A rain delay control can be incorporated into the controller and/or the remote control device so a user can conveniently, without having to reset the controller program or remember to turn on a controller that has been turned off, set the controller to skip watering for selected periods such as twenty-four hours, forty-eight hours, or seventy-two hours.

The controller apparatus support structure includes a housing, the lower portion of which includes wiring terminals, which may be configured to accept thereon a wire shield that directs the wires through a single opening or into a conduit along with the usual terminal cover which covers the terminals.

BRIEF DESCRIPTION OF THE DRAWINGS

The best mode presently contemplated for carrying out the invention is illustrated in the accompanying drawings, in which.

DETAILED DESCRIPTION OF THE ILLUSTRATED EMBODIMENTS

Figure 1:
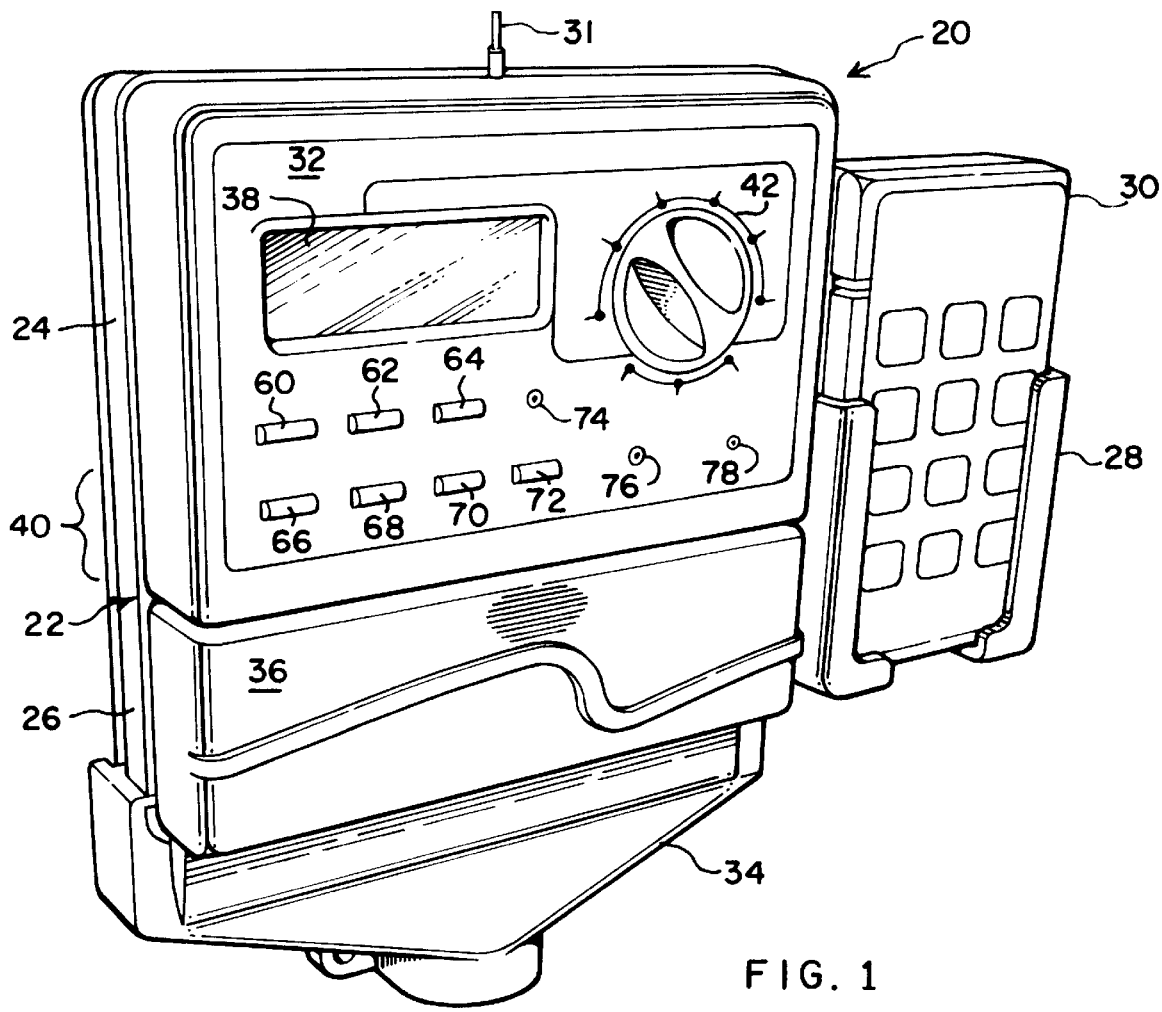
FIG. 1 is a perspective view of the remotely controllable programmable controller of the present invention.

As illustrated in FIG. 1, a programmable irrigation or sprinkler controller 20 comprises a support structure 22 which includes an upper control module portion 24, a lower terminal portion 26, and a holster 28 which removably holds a remote control unit 30. An antenna 31 extends from controller 20 to aid in picking up RF signals transmitted by remote control unit 30. A cover 32 fits over and is attached to control module portion 24, a removable wire shield 34 is attached to lower terminal portion 26 with a terminal block cover 36 securing wire shield 34 in place and covering lower terminal portion 26. A liquid crystal display (LCD) 38, a plurality of keys designated generally as 40, a rotary switch 42, and several other input devices are available to a user through cover 32.

Figure 2:
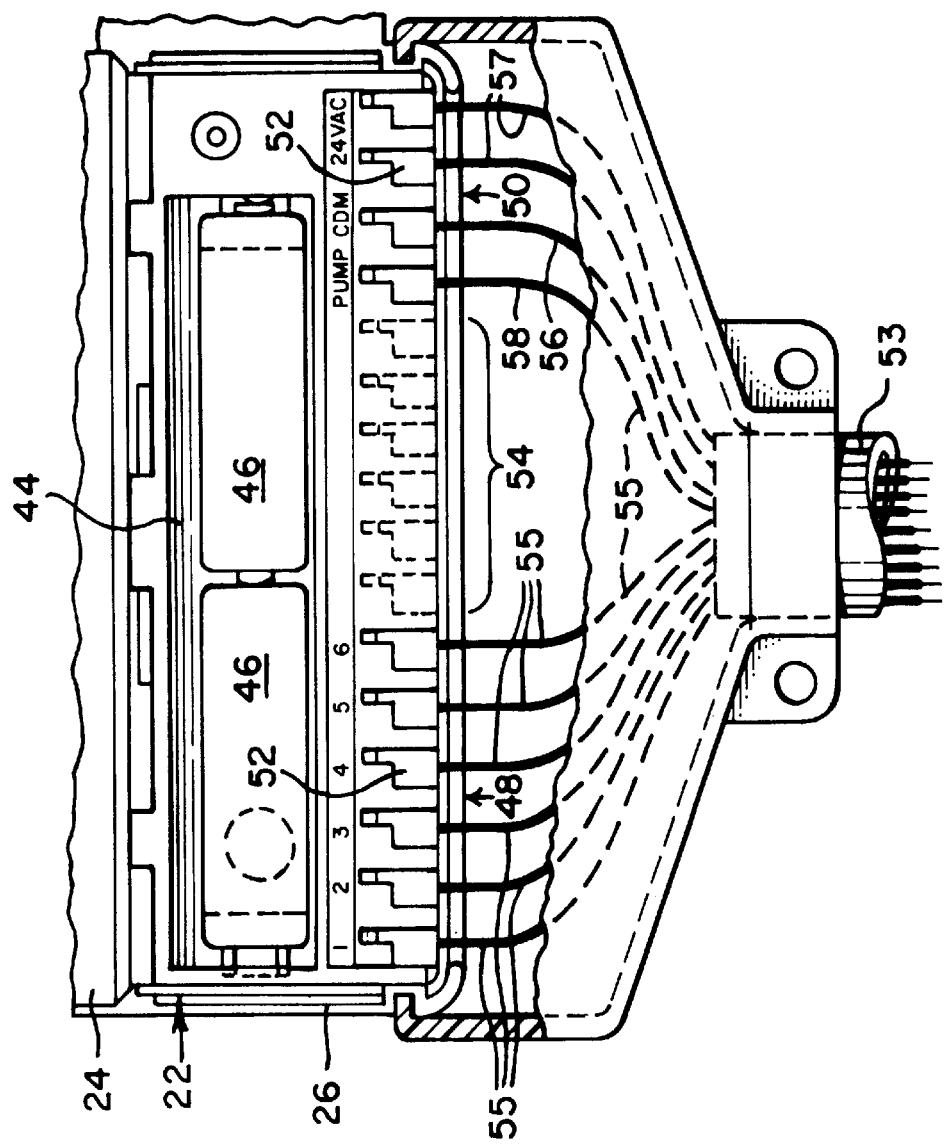
FIG. 2, a fragmentary view of FIG. 1 with the lower cover removed to show the batteries and terminal connections and with the wire shield partially broken away to show portions of the wiring.
Figure 5:
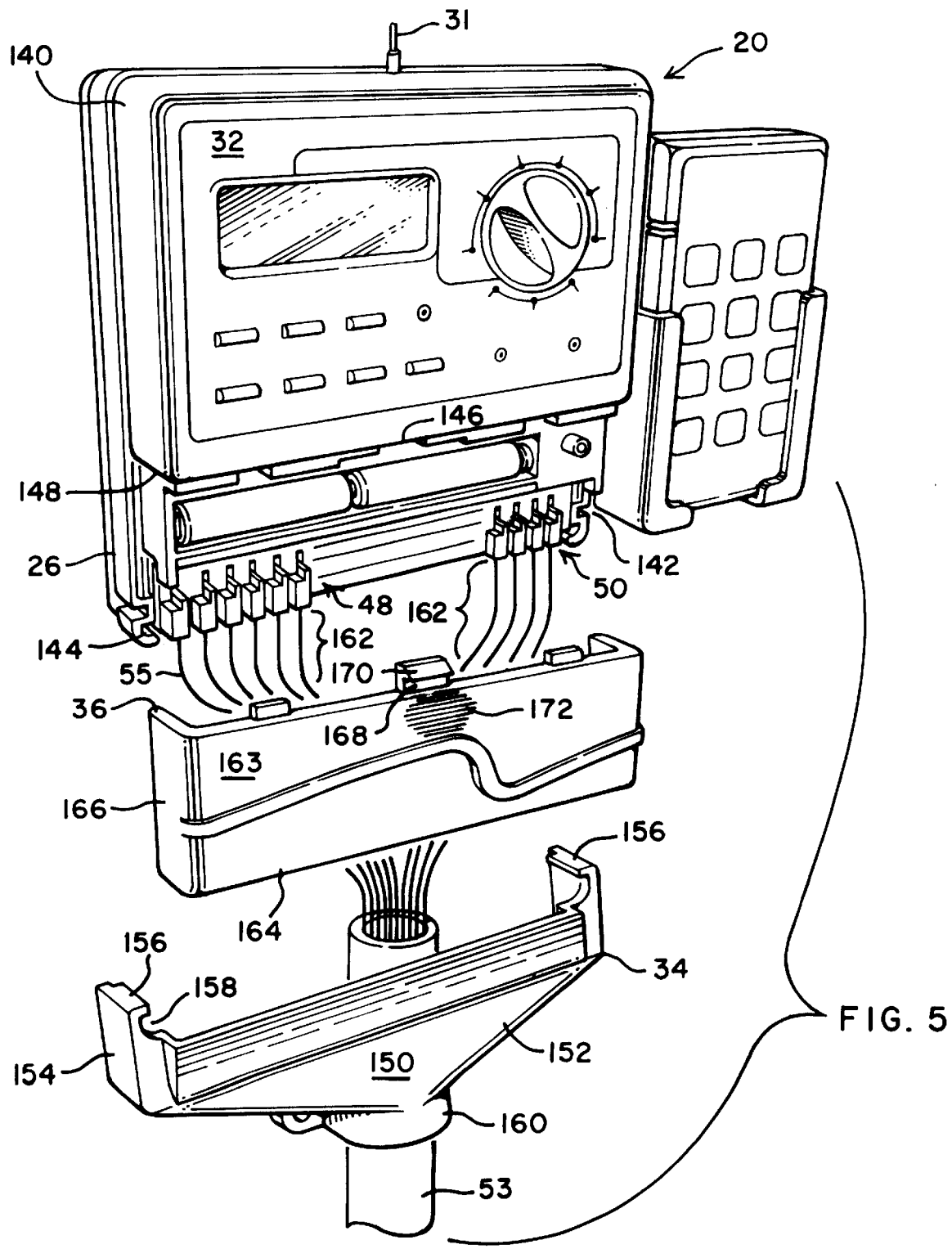
FIG. 5, an exploded fragmentary perspective view showing the details of the support structure, wire shield, and lower cover.

As shown in FIG. 2, which shows lower terminal portion 26 with a portion of wire shield 34 broken away and cover 36 removed, the controller 20 includes a battery compartment 44 to receive therein a pair of batteries 46 which supply back-up power to maintain the internal timer settings of the programmable controller during power outages. A first terminal strip 48 and a second terminal strip 50 each having a plurality of spring terminal clips 52 are affixed to lower terminal portion 26. Wires 55 extend from individual terminals of first terminal strip 48 for electrical connection to individual electrically operated water valves with wire 56 extending from a common terminal of second terminal strip 50 to each of the individual valves. Wires 57 bring in the usual AC power from a transformer plugged into a wall socket. If an irrigation pump is used to supply water to the sprinklers, wire 58, in conjunction with common wire 56, extends to a pump relay to activate the pump during a sprinkling cycle or at any time operation of a set or zone of sprinklers is desired. The wires described can extend from terminal strip 48 and 50 and be directed as desired out to the valves to be controlled, but preferably are gathered by wire shield 34 and directed into a protective conduit 53. While six spring terminal clips 52 are shown on first terminal block 48, there can be less or there can be more than six, with space 54 accommodating a terminal block with up to an additional six spring terminal clips 52 so that the controller could control up to twelve separate sprinkler zones. Rather than spring terminal clips, screw terminals or other types of terminals could be used.

Referring again to FIG. 1, affixed to cover plate 32 are an LCD display 38, keys 40, and rotary switch 42 to facilitate programming of the programmable controller. Rotary switch 42 provides several functional programming selections for individual watering stations or zones operated by programmable controller 20. These functions include:

(1) TIME/DATE which sets the calendar and clock time;
(2) START TIMES Schedule "A" which sets the four start times for Schedule "A";
(3) STATION/DURATION Schedule "A" which sets stations and watering duration for Schedule "A";
(4) WATERING DAYS Schedule "A" which sets the watering days for Schedule "A";
(5) START TIMES Schedule "B" which sets the four start times for Schedule "B";
(6) STATION/DURATION Schedule "B" which sets stations and watering duration for Schedule "B";
(7) WATERING INTERVAL Schedule "B" which sets the watering interval setting for Schedule "B";
(8) OFF which suspends watering and turns all stations off; and
(9) AUTO which enables the automatic watering mode of Schedules "A" and "B".

The AUTO position causes programmable controller 20 to automatically water each station or zone according to its individualized preprogrammed schedule. The OFF position provides an overriding means that inhibits all automatic and manual watering of programmable controller 20, until such time as rotary switch 42 is moved from the OFF position, or unless remote control unit 30 sends an RF signal.

Keys 40 are preferably push-button dome keys which assist with the setup and entry of various programming functions of rotary switch 42 as described above. A MANUAL key 60 provides extra watering for all stations or for a particular watering station for a specific duration of time. A CLEAR key 62 operates to clear the existing setting of the active field during programming and initialize the twenty-four hour inhibit mode. A NEXT key 64 scrolls through different programming fields such as start times, watering days, interval, station number, year, month, day, etc.

A "+" key 66 and a "−" key 68 are used to alter time intervals forwards and backwards, respectively, while the user programs time settings. An ENTER key 70 confirms the existing setting of the watering station during the programming procedure. A RAIN DELAY key 72 allows skipping the programmed watering for a twenty-four, forty-eight, or seventy-two hour period such as when rainfall has been adequate. A pin hole type RESET button 74 provides a means for resetting the programmable controller 20 to a default setting. Various default settings could be used such as date set at "Wednesday, Jan. 1st 1997", clock set at 12:00 am, all outputs disabled, and all start times and programs cleared. Alternately, the default setting could be set to water all stations for a set time, such as fifteen minutes, on alternating days. A pin hole type TRANSMITTER PROGRAM button 76 is used in conjunction with particular remote control units to program the programmable controller 20 to respond to its command transmissions. An RF ACTIVE indicator such as light emitting diode (LED) 78 lights when the programmable controller 20 is being operated by a remote control module.

Figure 3:
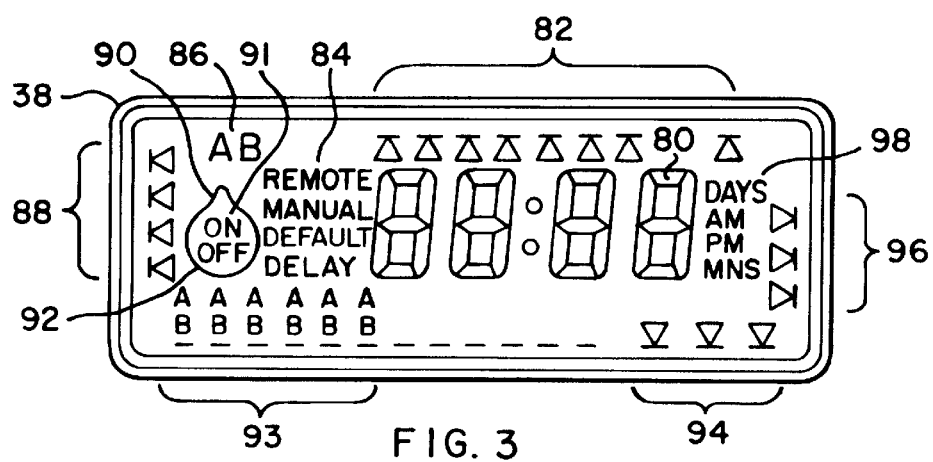
FIG. 3, an enlarged view of the display of FIG. 1 showing the details of the display.

Referring to FIG. 3, LCD display 38 is provided to communicate the entry of programmed information into and to show the current programmed status of the programmable controller 20. The LCD display 38 preferably includes:

(1) a four digit seven-segment per digit LCD display 80 which is used at different times to indicate year, date, time, and duration of automatic watering;
(2) eight indicator flags 82 signifying a two week (Monday through Sunday) period for use when initiating Schedule "A" watering commands or programming options with the last indicator flag 82 indicating whether the first or second week of the two week period is being displayed by the other seven indicator flags 82;
(3) four status indicators 84 indicating remote, manual, default, and delay;

(4) programming indicators 86 representing Schedule "A" and Schedule "B" indicating which selected watering program has been activated for a particular watering station or zone;

(5) four start time indicators 88 indicating which of the four start times is being programmed;

(6) a water drop watering signal 90 indicating the watering status of programmable controller 20;

(7) an ON indicator signal 91 representing the activated status of programmable controller 20 as either operating in an automatic watering mode or a manual mode;

(8) an OFF indicator signal 92 manually inhibiting a watering station or zone from being electronically activated;

(9) schedule indicators 93 signaling which stations or zones have been programmed to which of Schedules "A" and "B", the number of columns being equal to the number of stations to be controlled by the controller. For the illustrated controller, six stations can be controlled so six columns are shown;

(10) indicators 94 indicating whether the day, month, or year is being shown by display 80;

(11) indicators 96 indicating whether the Schedule "B" is on interval, odd, or even; and

(12) day, am, pm, minutes indicator 98 showing which is being shown by display 80.

LCD display 38 functions to provide a readable means of communicating the programming status to the user regarding watering cycles and programming modes of programmable controller 20. The schedule indicators 93 are set so that a user, by looking at such indicator, knows which programs A, B, or both are scheduled to run that day.

Figure 4:
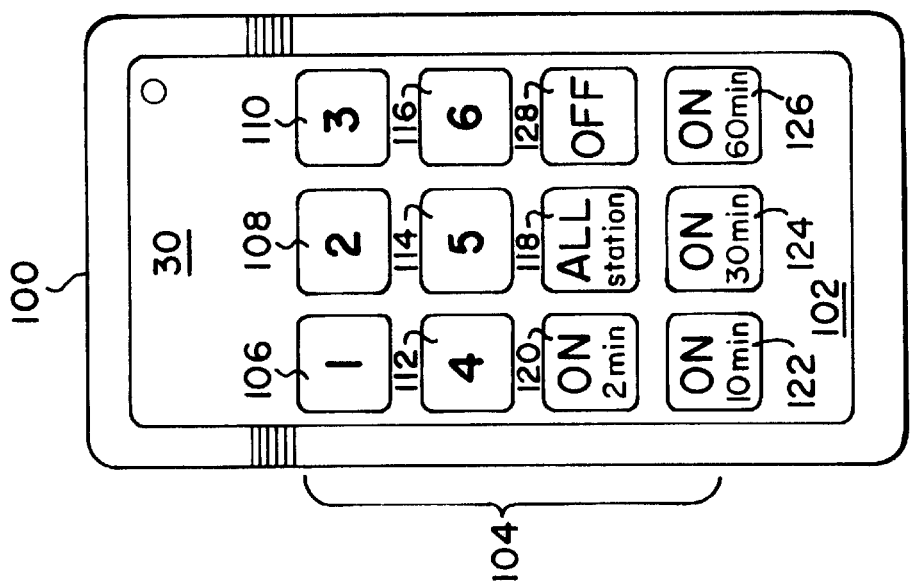
FIG. 4, a front elevation of the removable remote control unit.
Figure 6:
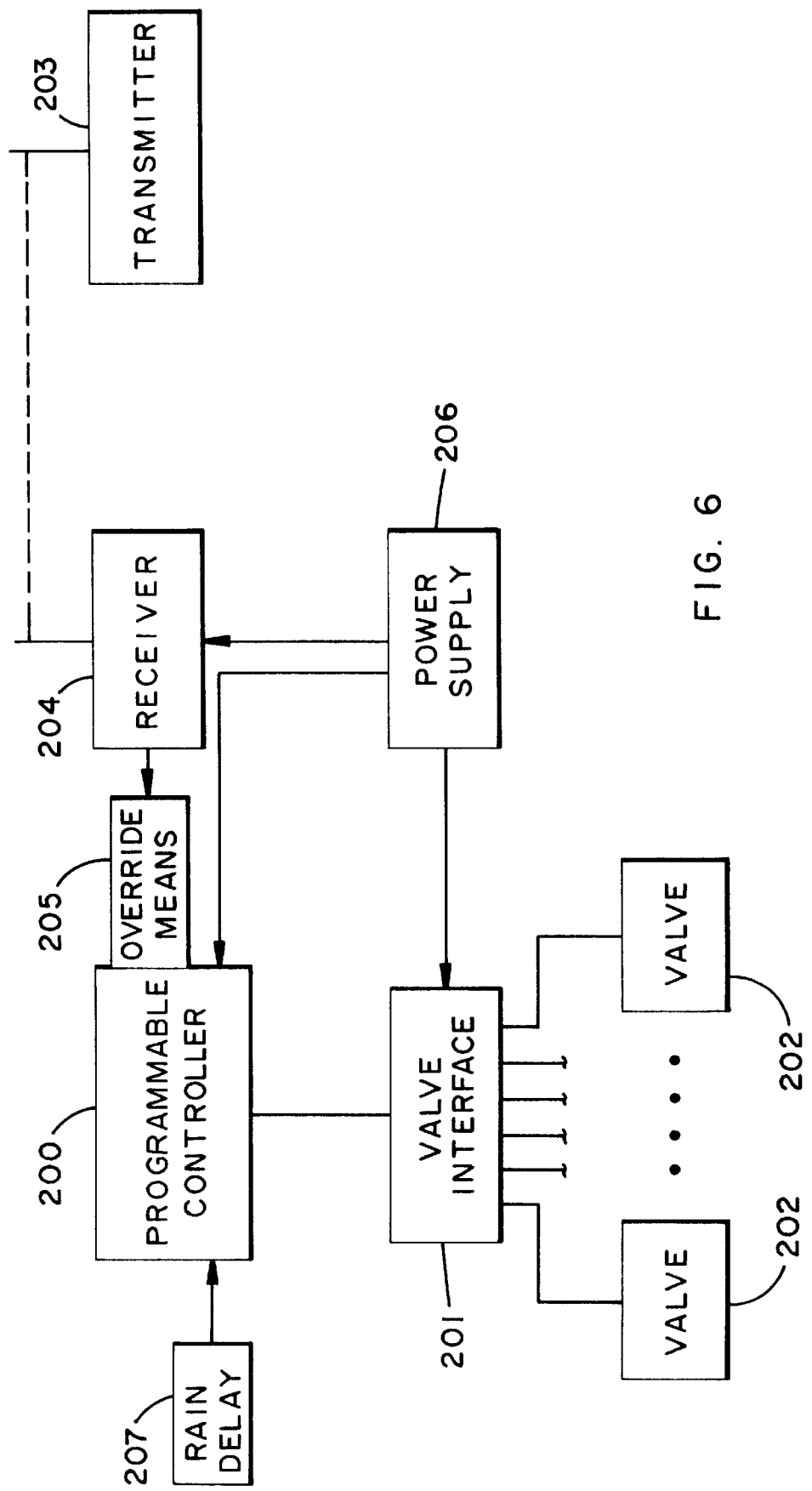
FIG. 6, a block diagram of the circuitry of the invention.

Remote control unit 30, FIGS. 1, 4, and 6 includes a housing 100, and a membrane type keypad 102, with a plurality of membrane keys 104. This particular remote control unit can be used to remotely control up to six different sprinkler valves for controlling six different sprinkler zones. Keys 106, 108, 110, 112, 114, and 116 each correspond to one of six sprinkler valves while key 118 corresponds to all of the sprinkler valves. Keys 120, 122, 124, and 126 turn the chosen sprinkler valve or valves on, one at a time in sequential order, for a preset timed period such as time periods of two, ten, thirty, and sixty minutes, respectively. Key 128 turns the chosen sprinkler or sprinklers off. A twelve sprinkler remote control module has an additional six keys and any number of versions can be made from one to more than twelve sprinkler valve versions.

The remote control units are provided with codes so that it is unlikely that two or more people living in close proximity will obtain a remote control unit which transmits the same code. This allows neighbors to each have a remote control system of the invention to each remotely operate their own sprinkler system without also operating a neighbor's system. Because of this, it is necessary to set the programmable controller to recognize the code of transmitters it should respond to. Thus, the controller is programmed so that a user can depress TRANSMITTER PROGRAM button 76 and then press a button on the remote control unit to transmit a signal and the controller will then recognize that code and take instructions from that remote control unit. It is preferred that a controller be able to be set to recognize and act on signals from several different remote control units.

As previously indicated, it is currently preferred in many applications to provide a wire shield 34. Such shield is not necessary, but when provided, is preferably removably positioned on lower terminal portion 26. Lower terminal portion 26 has a pair of side walls 140 having a pair of grooves 142 therein and a pair of rounded corner pieces 144. A slot 146 extends through a bottom wall 148 of front panel 32. Wire shield 34 includes a front wall 150, a three-sided lower funnel portion 152, and a pair of side walls 154. Each of side walls 154 have a tab 156 with a cutout 158 disposed between front wall 150 and side walls 154 with tabs 156. Each of tabs 156 are adapted to slide within the corresponding groove 142 of side walls 140 with each of cutouts 158 providing clearance for the respective rounded corner piece 144 to nest. At the lower end of funnel portion 152 is a neck 160 through which conduit 53 can pass so as to protect the actuator valve wires 162 extending from the terminal blocks 48 and 50. Terminal block cover 36 has a front wall 163, a bottom wall 164, and side walls 166. A locking tab 168 projects from front wall 163 and has a locking projection 170 thereon. Locking tab 168 is sized so as to closely pass through slot 146 in bottom wall 148 with locking projection 168 engaging the same to retain wire shield 150 and cover 162 in place. A roughened gripping section 172 in front wall 163 may be used to aid in removing terminal block cover 36. With this arrangement, when cover 36 is in place, wire shield 34 is locked into position.

FIG. 6 is a block diagram of the electrical circuitry of the remotely controllable programmable controller apparatus. A programmable controller means 200 is programmed by and manually controlled by operation of rotary switch 42 and keys 40 in the manner described, although various controller means with various input and control means could be used. The programmable controller means will usually include a microcontroller or microprocessor, both hereinafter referred to as a microprocessor, a memory, a display, and one or more input means such as a keyboard, keys, switches, etc. The normal microprocessor based timer circuitry can be used. As is normal for such timer circuitry, the controller produces electrical output signals to control selected valves in accordance with instructions programmed into the controller. Generally the controller will produce an actuation signal indicating when a selected valve should be activated. This signal operates a valve interface circuit 201 to actually supply the necessary power to the selected one of valves 202 to cause activation. When the activation signal stops, the selected valve is deactivated.

The invention provides a remote control unit transmitter 203 for remote control of the sprinkler valves through the controller so that instructions given through the transmitter override the normal operation in accordance with the instructions programmed into the controller means. However, the instructions from the transmitter generally do not change the programmed instructions. Signals from the transmitter are received by a receiver 204 associated with the controller. The received signals are sent to the controller where an override means 205 causes the received instructions to be acted upon so that the sprinkler valves 202 are operated in accordance with the received signals rather than in accordance with the instructions programmed into the controller. Thus, if a valve is activated through the programmed instructions, the valve can be deactivated by a received deactivate signal which overrides the normal activate signal in the controller. The override means will normally be a portion of the software program operating the microprocessor in the controller 200. This portion of the software may be added to the normal controller software for controllers of the invention, or completely new software for the controller may be provided, but such programming is straight forward for a person skilled in the programming art knowing the desired operation of the controller as set forth herein.

Power for the controller circuitry is supplied by power supply 206. Power to control the valves is generally provided by a twenty-four volt transformer, with power to operate the controller circuitry being reduced in voltage by a voltage regulator or other circuitry. Batteries are preferably provided as backup power in case of a power outage so the controller does not lose programmed information. The remote control unit is battery powered and includes a nonvolatile memory to store the transmitter code and other program information so such information is not lost when batteries get low or are changed.

A further feature of the invention is the provision of a rain delay override in the controller. This feature will usually be operated by a push button or other switch 207. Upon operation by a user, switch 207 provides an input to controller 200 which generally through additional software in the controller will override normal programmed operation of the controller to prevent activation of valves 202 for a preselected period of time. Generally, if rain occurs, a user will want to put off watering for a selected period to conserve water. While various time periods can be programmed into the software for a rain delay period, it has been found that periods of multiples of days are presently preferred. Thus, for light rain, a delay of one day may be desirable. For heavy rain, a delay of two to three days may be desirable. The rain delay may be programmed to provide a delay of one day upon single operation of rain delay switch 207, two days when switch 207 is depressed twice, and three days when it is depressed three times. Generally delays of more than three days will not be desirable. However, if more rain occurs during the rain delay period, the rain delay switch can be activated to increase the remaining delay period.

While all features of the invention have been described in connection with the illustrated embodiments which include a remote control unit, various of the features of the invention, such as the rain delay or wire shield, can be used in conjunction with controllers that do not include remote control features.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim:

1. A remotely controllable programmable controller apparatus for selectively activating and deactivating a plurality of irrigation valves each of which supplies water to one or more watering locations within an area to be irrigated, comprising:

programmable controller means for determining when particular irrigation valves should be activated and deactivated in accordance with instructions programmed into the controller means and for producing output signals to control selected valves in accordance with such determination;

remote control means for transmitting signals indicative of desired sprinkler operation supplemental to the programmed operation to the programmable controller apparatus;

receiver means associated with the programmable controller apparatus for receiving signals transmitted from the remote control means; and override means responsive to the received signals for causing the programmable controller means to produce the output signals in accordance with received signals rather than in accordance with the instructions programmed into the controller means when received signals are present.

2. A remotely controllable programmable controller apparatus according to claim 1, wherein the programmable controller means includes a programmed microprocessor.

3. A remotely controllable programmable controller apparatus according to claim 2, wherein the programmed microprocessor includes the override means.

4. A remotely controllable programmable controller apparatus according to claim 1, wherein the remote control means is identified by a code included as part of the transmitted signals, and the programmable controller means is programmed to recognize specific codes in the received signals prior to responding to such received signals.

5. A remotely controllable programmable controller apparatus according to claim 4, wherein a user can program the programmable controller means to recognize signals from particular remote control means.

6. A remotely controllable programmable controller apparatus according to claim 5, wherein the user can program the programmable controller means to recognize signals from a plurality of remote control means.

7. A remotely controllable programmable controller apparatus according to claim 1, wherein the programmable controller means includes a display, the programmable controller means can activate and deactivate valves in accordance with two independent sets of instructions programmed into the controller means, and the controller is programmed to display to a user the programmed instructions to be carried out in a particular time period.

8. A remotely controllable programmable controller apparatus according to claim 7, wherein the particular time period is a day.

9. A remotely controllable programmable controller apparatus according to claim 1, additionally including a user operable rain delay control, and wherein the programmable controller means is programmed to prevent activation of irrigation valves in accordance with the programmed instructions for a rain delay period of time.

10. A remotely controllable programmable controller apparatus according to claim 9, wherein the rain delay period is selectable by a user in multiples of a preset time period.

11. A remotely controllable programmable controller apparatus according to claim 10, wherein the preset time period is twenty-four hours.

12. A remotely controllable programmable controller apparatus according to claim 1, wherein the controller apparatus includes:

support structure having at least one terminal strip disposed at an edge thereof for attachment of a plurality of wires extending into an outwardly directed conduit;

a wire shield adapted to slideably engage the edge of the support structure to shield the wires extending from the terminal strip and funnel them into the conduit; and a terminal block cover which attaches to the support structure over the terminal block to shield the terminal block and wires extending therefrom and retain said wire shield in position over the wires.

13. A remotely controllable programmable controller apparatus according to claim 12, wherein:

the wire shield includes a front wall and a pair of side walls each having a tab adapted to slide within a corresponding groove in each of a pair of side walls of the controller apparatus; and the terminal block cover includes a front wall, a bottom wall, and side walls, said front wall including a locking tab which closely passes through a slot in a bottom wall of the controller apparatus, said locking tab including a locking projection which engages said bottom wall to retain said wire shield and cover in place.

* * * * *